July 17, 1956 F. W. HICKS, JR 2,754,840
VALVES
Filed Jan. 29, 1953 13 Sheets-Sheet 1

Inventor
Frederick W. Hicks Jr
By
Mann, Brown & Hausmann
Attorneys

July 17, 1956  F. W. HICKS, JR  2,754,840
VALVES

Filed Jan. 29, 1953  13 Sheets-Sheet 2

Inventor
Frederick W. Hicks Jr
By
Mann, Brown & Hausmann
Attorneys

July 17, 1956 F. W. HICKS, JR 2,754,840
VALVES
Filed Jan. 29, 1953 13 Sheets-Sheet 3

Inventor
Frederick W. Hicks Jr
By Mann, Brown & Hausmann
Attorneys

July 17, 1956 F. W. HICKS, JR 2,754,840
VALVES
Filed Jan. 29, 1953 13 Sheets-Sheet 4

Inventor
Frederick W. Hicks Jr.
By
Mann, Brown & Hausmann
Attorneys

July 17, 1956

F. W. HICKS, JR 2,754,840

VALVES

Filed Jan. 29, 1953

Inventor
Frederick W. Hicks, Jr.
By Mann, Brown & Hausmann
Attorneys

July 17, 1956 — F. W. HICKS, JR — 2,754,840
VALVES
Filed Jan. 29, 1953 — 13 Sheets-Sheet 6

Inventor
Frederick W. Hicks Jr
By Mann, Brown & Hausemann
Attorneys

July 17, 1956  F. W. HICKS, JR  2,754,840
VALVES
Filed Jan. 29, 1953  13 Sheets-Sheet 7
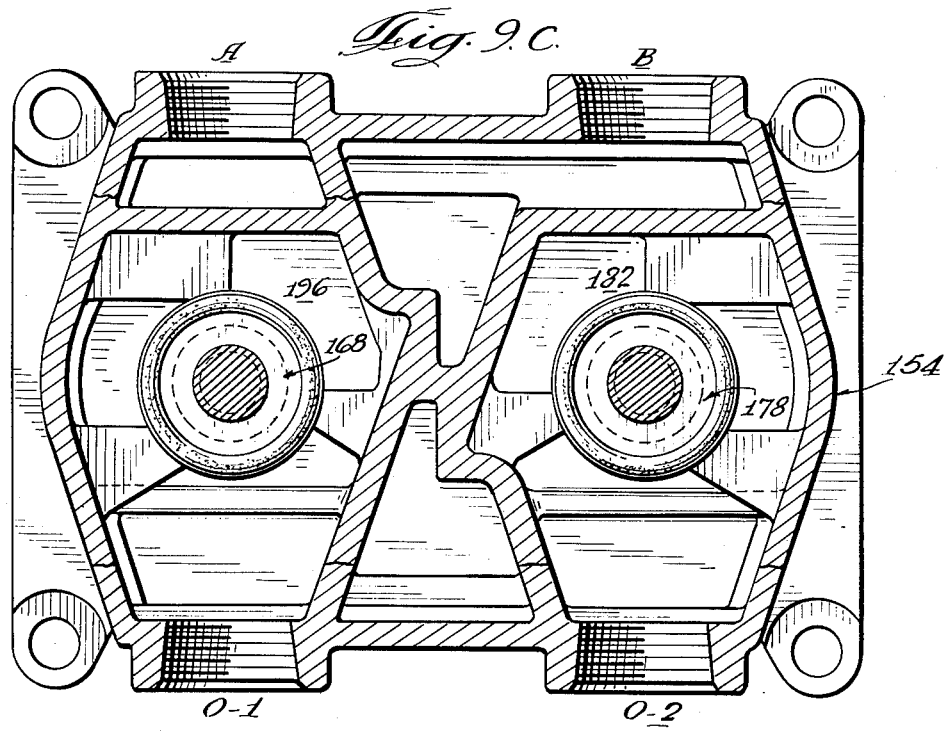
Fig. 9.C.
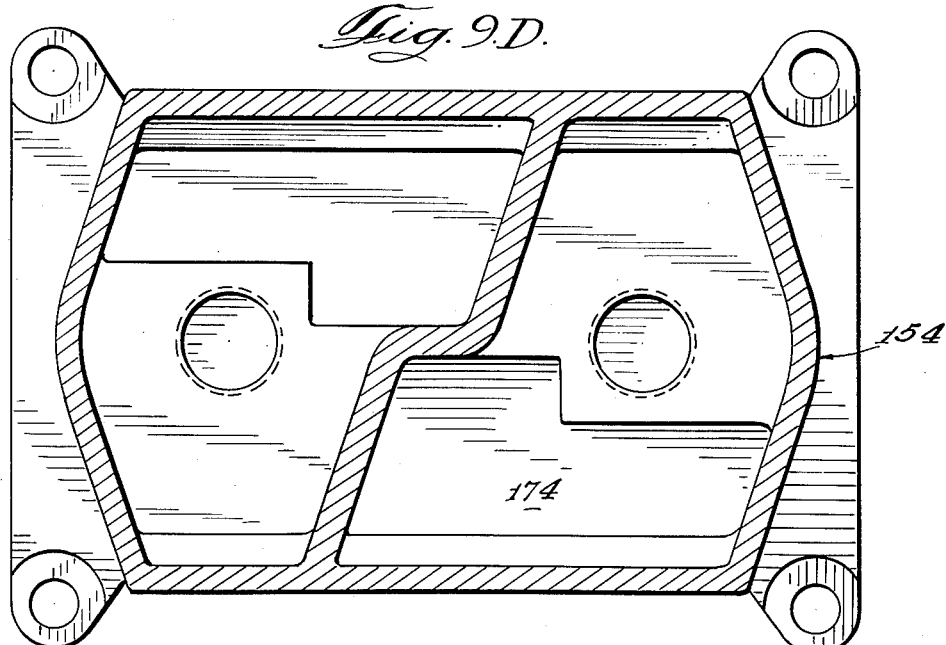
Fig. 9.D.
Inventor
Frederick W. Hicks Jr
By
Mann, Brown & Hanemann
Attorneys July 17, 1956 F. W. HICKS, JR 2,754,840
VALVES
Filed Jan. 29, 1953 13 Sheets-Sheet 8

Inventor
Frederick W. Hicks Jr
By
Mann, Brown & Hausmann
Attorneys

July 17, 1956   F. W. HICKS, JR   2,754,840
VALVES
Filed Jan. 29, 1953   13 Sheets-Sheet 9
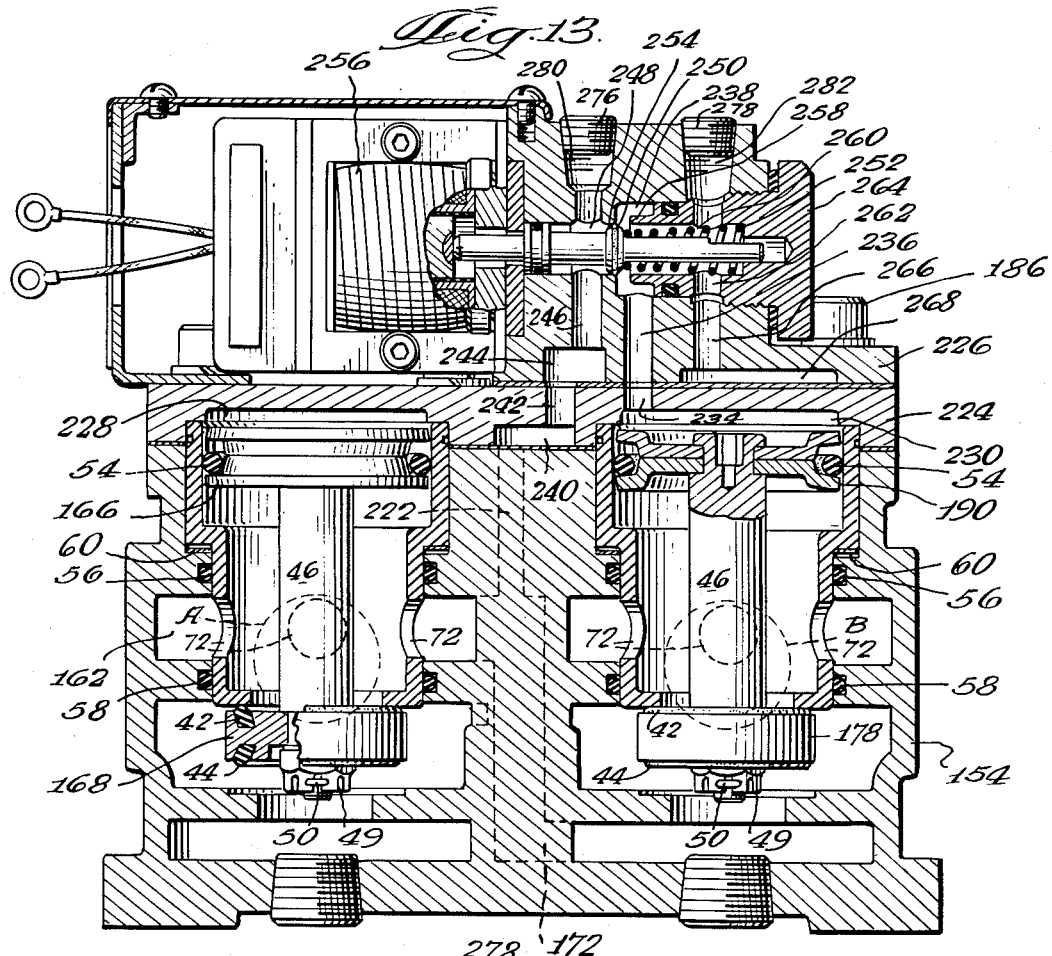
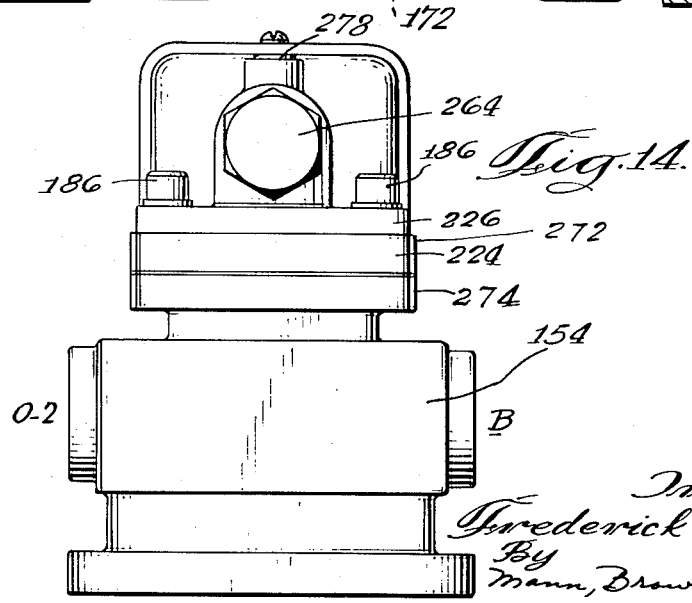
Inventor
Frederick W. Hicks Jr
By
Mann, Brown & Hausmann
Attorneys

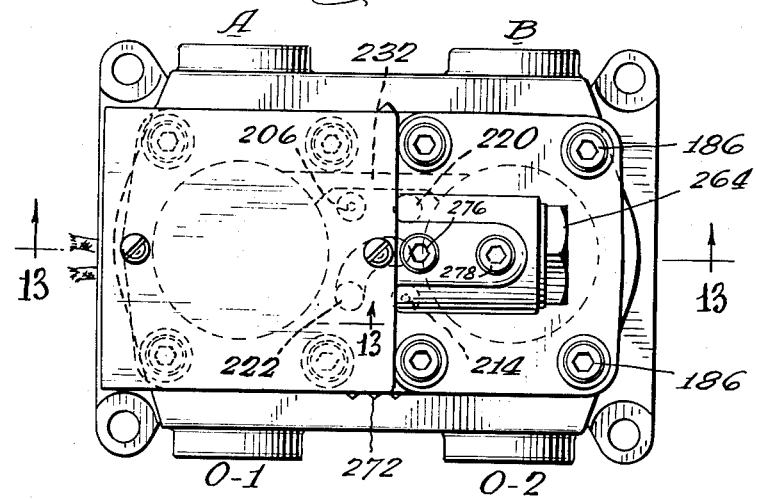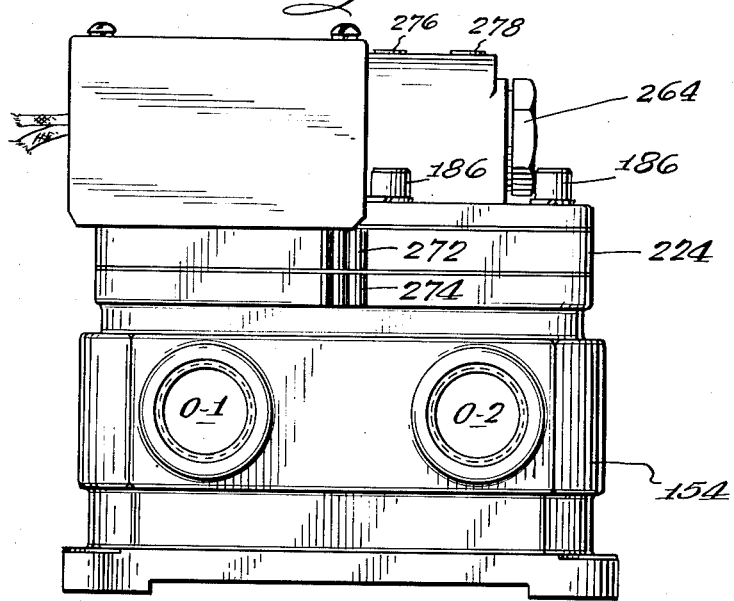

July 17, 1956     F. W. HICKS, JR     2,754,840
VALVES
Filed Jan. 29, 1953     13 Sheets-Sheet 11
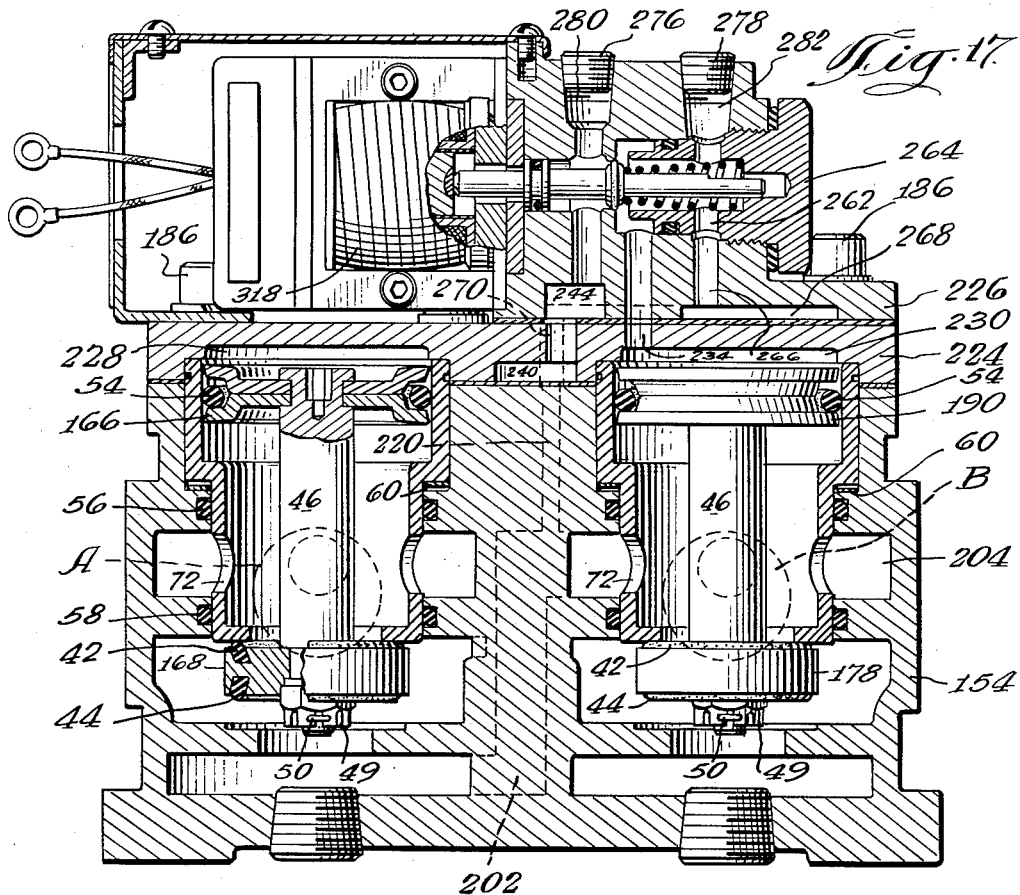
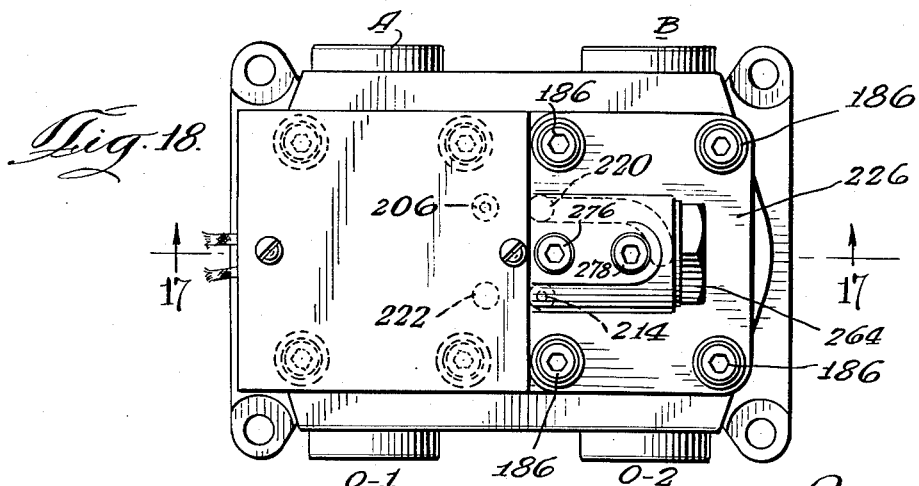
Inventor
Frederick W. Hicks, Jr.
By Mann, Brown & Hausmann
Attorneys

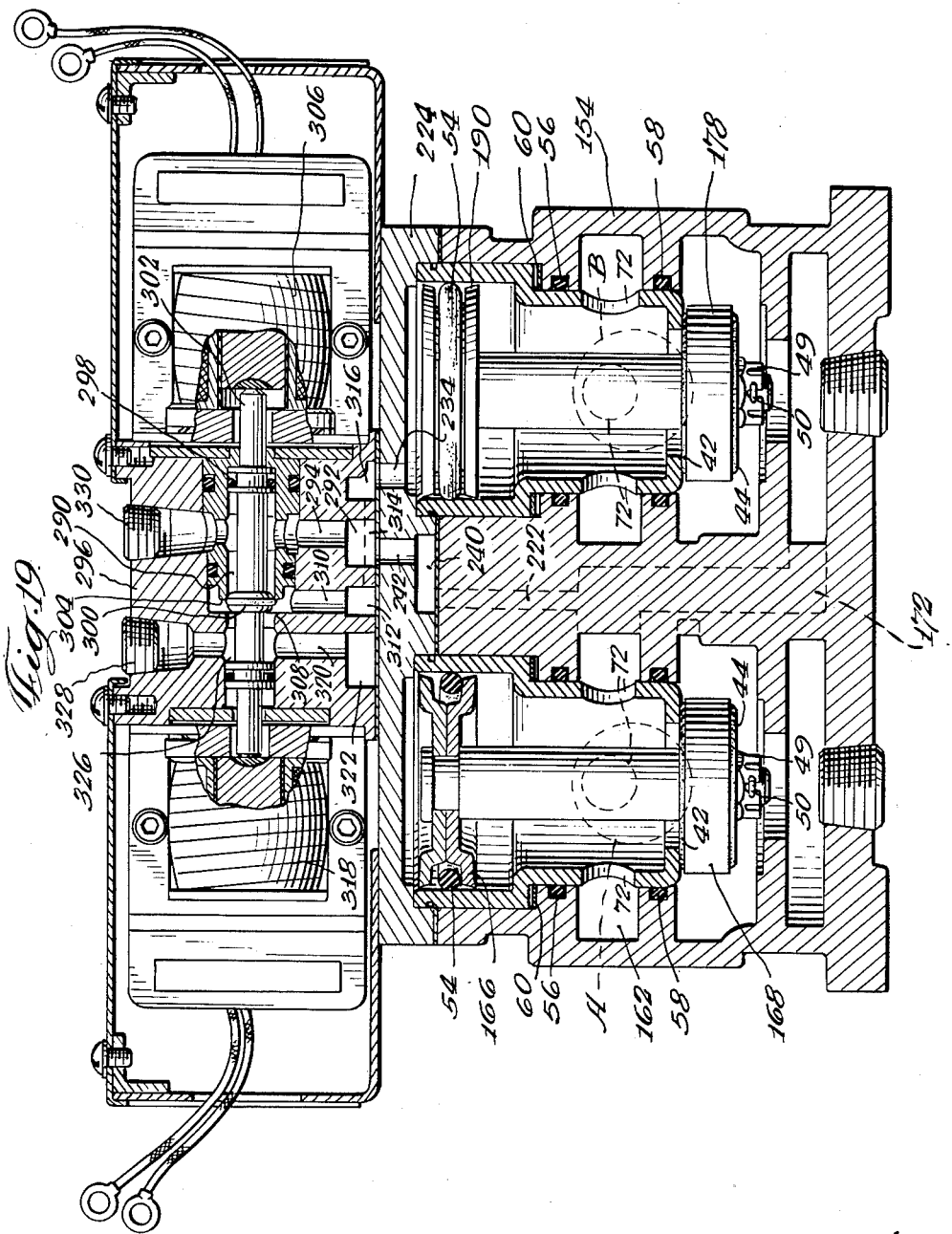

July 17, 1956 F. W. HICKS, JR 2,754,840
VALVES
Filed Jan. 29, 1953 13 Sheets-Sheet 13

Inventor
Frederick W. Hicks Jr
By
Mann, Brown & Hausmann
Attorneys

United States Patent Office 2,754,840
Patented July 17, 1956

2,754,840

VALVES

Frederick W. Hicks, Jr., Skokie, Ill., assignor to Hannifin Corporation, Chicago, Ill., a corporation of Illinois Application January 29, 1953, Serial No. 333,921

7 Claims. (Cl. 137—454.6)

My invention relates to valves and more particularly to valves for controlling the flow of fluids to cylinders and a wide variety of other fluid pressure operated devices.

An object of my invention is to provide a new and improved valve which is more versatile and adaptable than valves of the prior art.

Another object of my invention is to provide a valve having a new and improved design of removable cartridge which can be replaced without breaking main piping connections.

Another object of my invention is to provide a new and improved valve of the piston-poppet type wherein the piston-poppet assembly seals under positive pressure at either end of a relatively short stroke.

Another object of my invention is to provide a new and improved valve of the kind indicated which is particularly adapted for high speed operation and in which the piston-poppet can be shifted almost instantaneously.

Another object of my invention is to provide a new and improved valve which may be readily made of corrosion resistant material whereby the valve is protected both from ambient atmospheric conditions and corrosive fluids.

Another object of my invention is to provide a new and improved valve having a wide pressure range.

Another object of my invention is to provide a valve having a new and basic design which may readily be incorporated in either 2-way, 3-way or 4-way valves.

Another object of my invention is to provide a new and improved valve in which the main valve mechanism is operated by pressure alone and requires no return spring.

Another object of my invention is to provide a new and improved valve which may be either pilot operated, or operated by any suitable form of remote control means.

Another object of my invention is to provide a new and improved pilot operated valve.

Another object of my invention is to provide a valve of the class described having new and improved valve operating and control mechanism.

Other objects and advantages will become apparent as the description proceeds.

Figure 9:
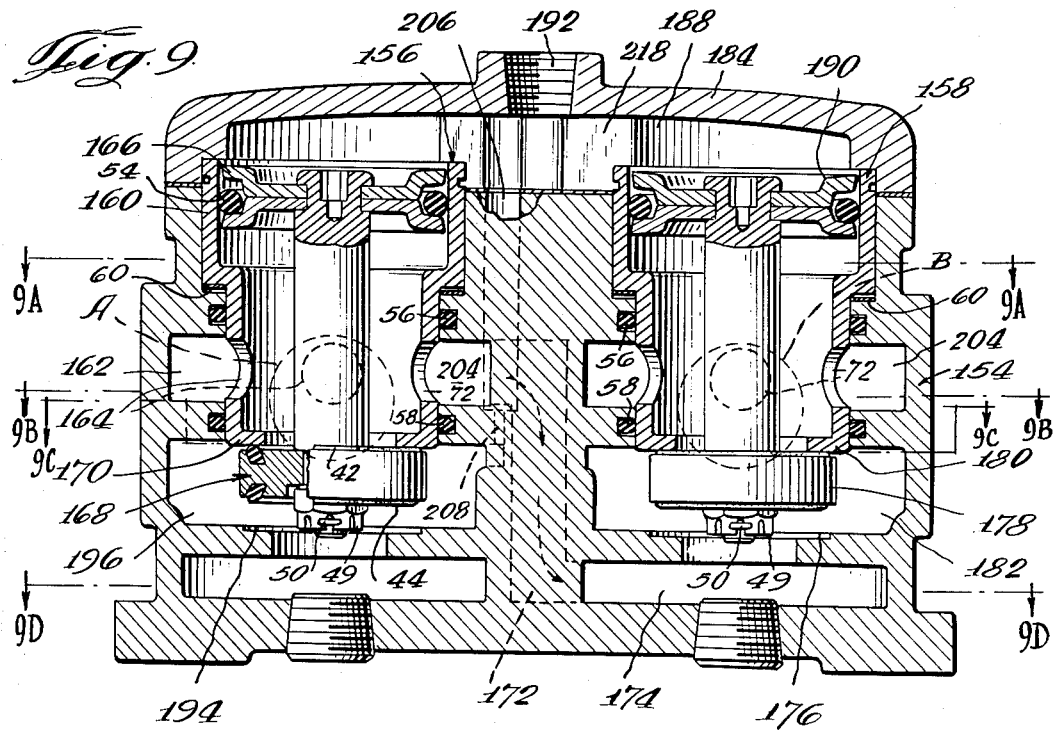
Fig. 9 is a vertical sectional view of a 4-way valve embodying my invention and is taken on line 9—9 of Fig. 11.
Figure 10:
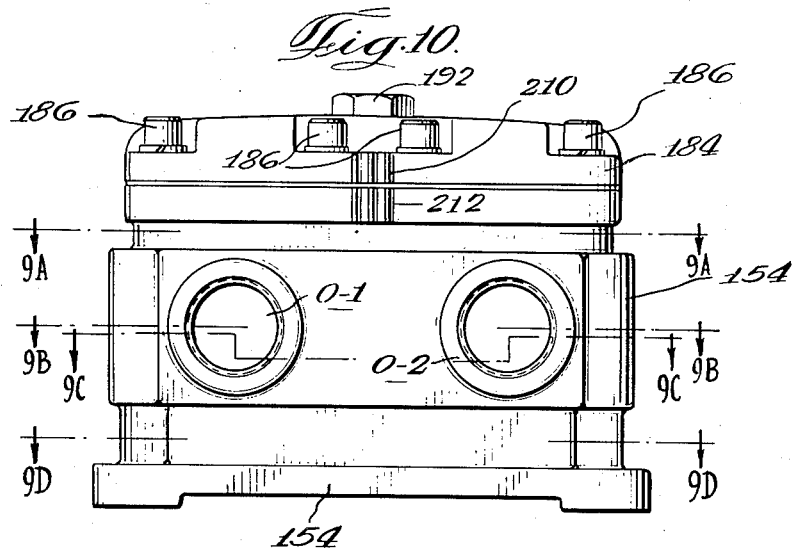
Figure 9A:
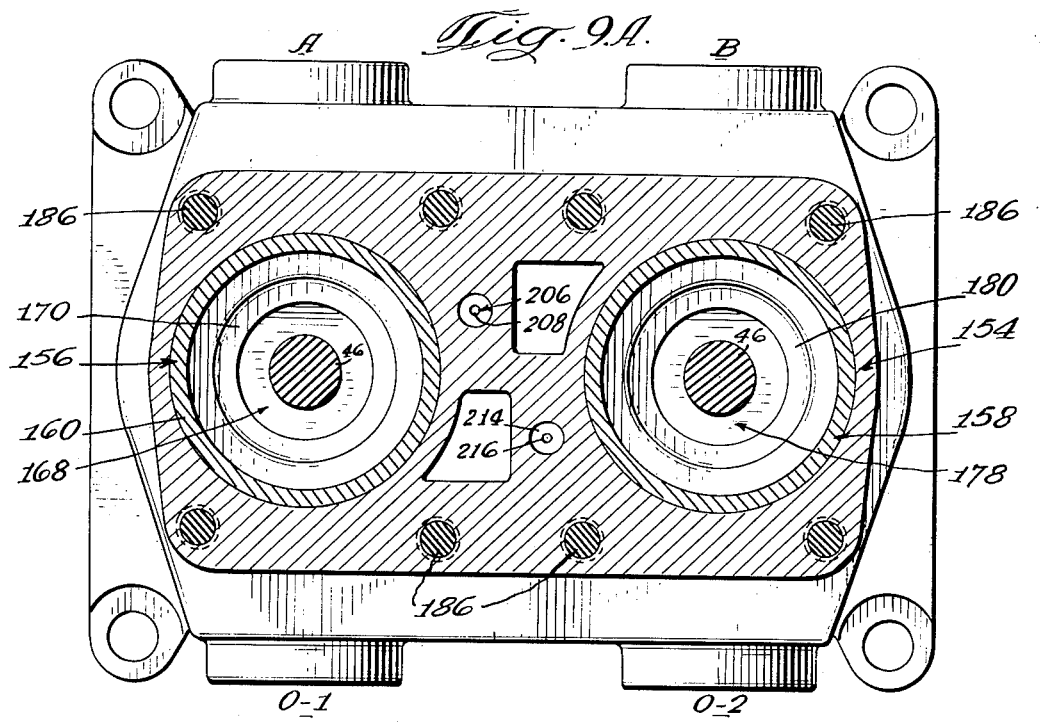
Figure 9B:
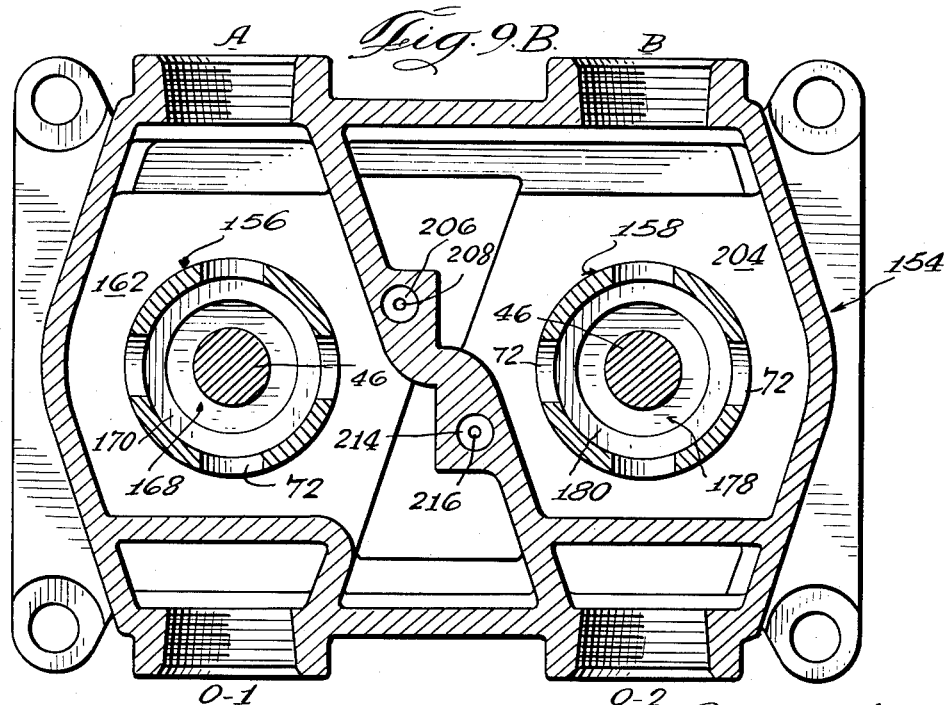
Figure 11:
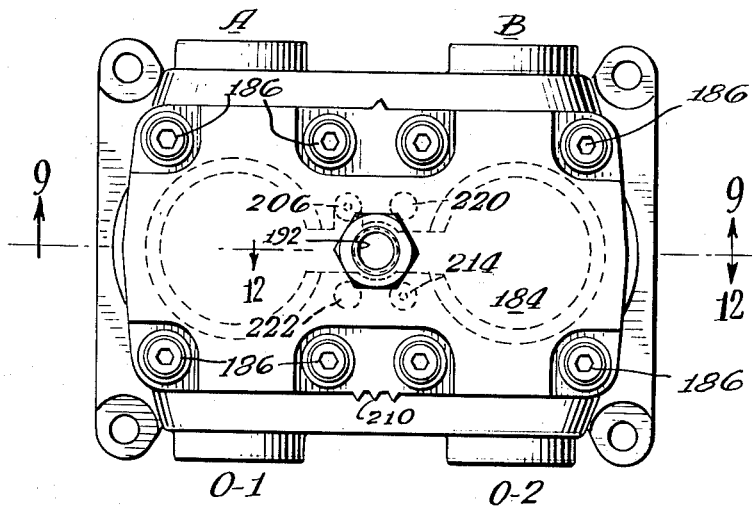
Figure 12:
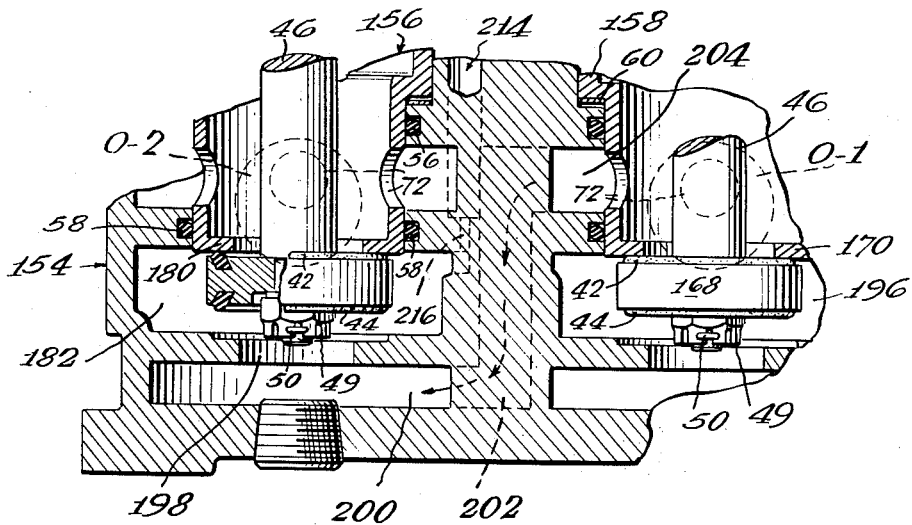
Figure 20:
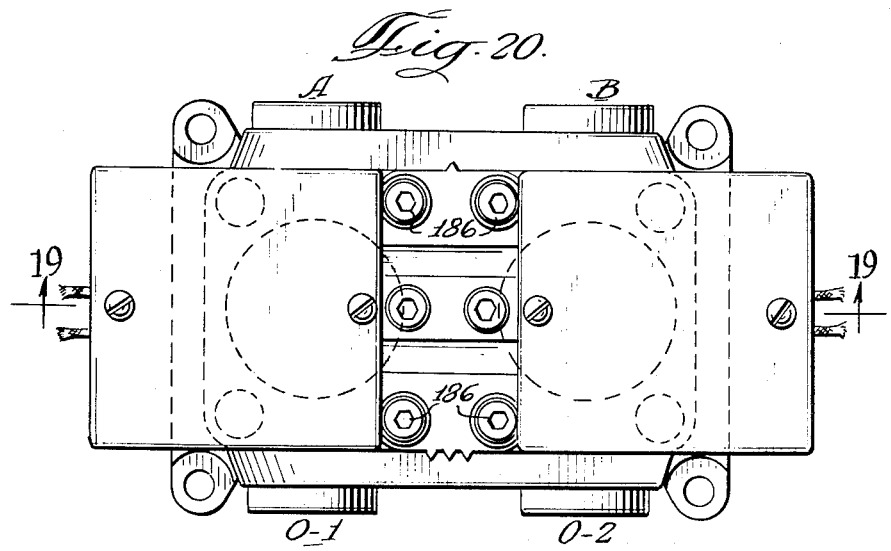
Figure 21:
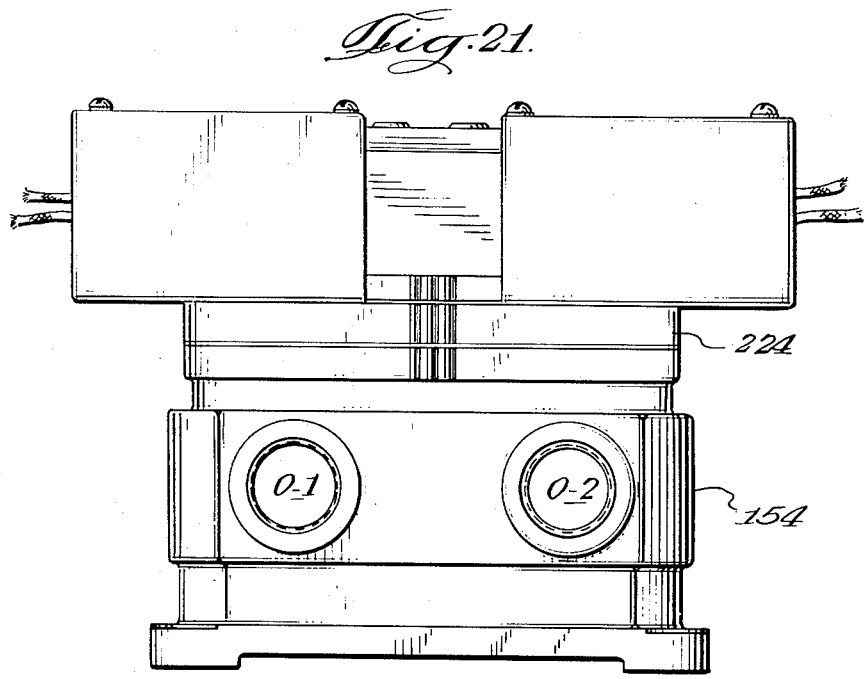

Figs. 9A, 9B, 9C, and 9D are transverse sectional views taken on the lines 9A—9A, 9B—9B, 9C—9C, and 9D—9D, respectively, of Figs. 9 and 10;

Fig. 10 is a side elevation on a reduced scale of the valve of Fig. 9;

Fig. 11 is a top plan view on a reduced scale of the valve shown in Fig. 9;

Fig. 12 is a partial vertical sectional view on an enlarged scale taken on the line 12—12 of Fig. 11;

Fig. 13 is a vertical sectional view of a valve like that shown in Fig. 9, but provided with a head having a solenoid controlled 3-way pilot and is taken on line 13—13 of Fig. 15;

Fig. 14 is an end elevation on a reduced scale of the valve of Fig. 13;

Fig. 15 is a top plan view on a reduced scale of the valve of Fig. 13;

Fig. 16 is a side elevation on a reduced scale of the valve of Fig. 13;

Fig. 17 is a vertical sectional view similar to Fig. 13 but taken on line 17—17 of Fig. 18;

Fig. 18 is a top plan view like Fig. 15, but showing a different port arrangement;

Fig. 19 is a vertical sectional view of a valve like that of Fig. 13 except for the construction of the solenoid operated pilot and is taken on line 19—19 of Fig. 20;

Fig. 20 is a top plan view on a reduced scale of the valve shown in Fig. 19; and Fig. 21 is a side elevation on a reduced scale of the valve of Fig. 19.

Figure 1:
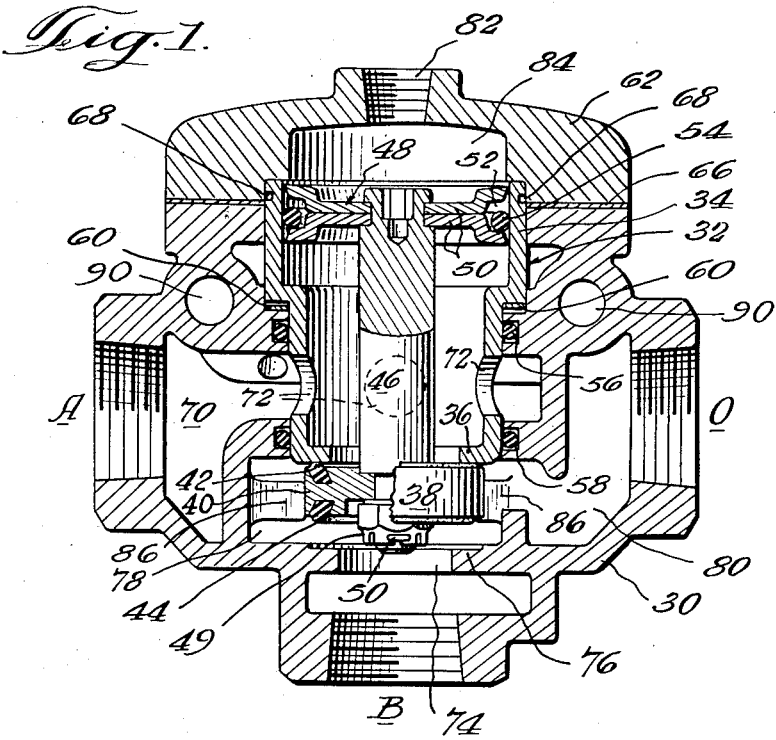
Fig. 1 is a vertical sectional view of one embodiment of my invention and is taken on line 1—1 of Fig. 3.
Figure 2:
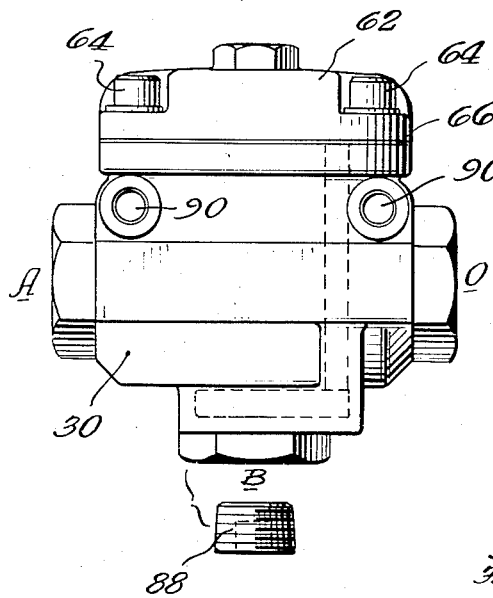
Fig. 2 is a side elevational view on a reduced scale of the valve of Fig. 1.
Figure 3:
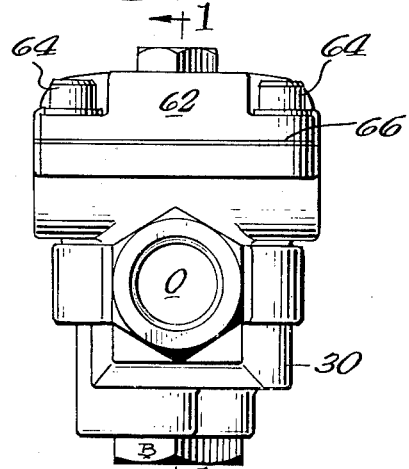
Fig. 3 is an end elevation of the valve of Figs. 1 and 2.

The embodiment of my invention shown in Figs. 1, 2 and 3 comprises a body 30 of red brass or other suitable material having a cartridge, indicated generally by reference character 32, removably mounted therein. This cartridge comprises a sleeve or shell 34 of yellow brass tubing or other suitable material drawn or otherwise formed to provide a two-diameter structure having an inturned lower end 36 forming an upper seat for a valve element 38. This valve element consists of a metallic part 40 of naval brass or other suitable material having a pair of annular grooves for the resilient sealing members 42 and 44 of Hy-Car synthetic rubber or other suitable synthetic or natural rubber or similar resilient material.

The valve element 38 is attached to the lower end of a piston-rod 46 of steel or other suitable material, a castellated nut 49 and cotter-pin 50 serving to secure the valve element 38 to the rod 46. A piston, indicated generally by reference character 48 is attached to the upper end of the piston-rod 46, the latter being riveted over to secure the piston in place. The piston 48 comprises a pair of snap metal discs 50 of brass or other suitable material providing an annular groove 52 for an O-ring 54 which has a normal outside diameter the same as the internal diameter of the adjacent portion of the sleeve 34. The internal diameter of the O-ring 54 is slightly greater than the diameter of the base of the groove 52 so that the O-ring is held against the sleeve 34 only by fluid pressure. As clearly shown the groove 52 is of greater width than the diameter of the O-ring 54.

A pair of O-rings 56 and 58 creates static seals between portions of the sleeve 34 and adjacent portions of the body 30. These O-rings 56 and 58 are under mechanical compression since they are of a normal diameter greater than the diametral depth of the grooves in which they are located. The O-rings 54, 56 and 58 may be of Hy-Car synthetic rubber or other synthetic or natural rubber or like resilient material.

A wave washer, or so-called Belleville type of spring, 60 of stainless steel or other suitable material urges the cartridge 32 upwardly into engagement against a head 62 which is removably secured to the body 30 by bolts 64. The head 62 may be a brass casting and a gasket 66 of neoprene impregnated paper, or other suitable material, seals the joint between the head 62 and body 30. When the head 62 is removed, the cartridge 32 may be pried out of the body 30 by inserting a screwdriver or similar tool in groove 68 provided for this purpose in the upper end of sleeve 34. It will be noted that the removable cartridge 32 including a sleeve 34, piston 48, piston rod 46, and valve element 38, which constitute a unitary assembly capable of ready removal for inspection or repair. Where my valve is to be used with corrosive gases or liquids, those parts formed of steel or other material subject to corrosion are made corrosion-resistant by providing them with a Parco-Lubrite plating.

Valve body 30 has three ports indicated by reference letters A, B and O, respectively, and is basically a 3-way valve adapted to be installed so that one port is connected to a supply of fluid under pressure, one port is connected to a port of a fluid operated cylinder or other mechanism, and one port is connected to atmosphere or an exhaust chamber. The port A communicates with a chamber 70 having a part surrounding the lower end of the sleeve 34 and communicating with the interior thereof by way of opening 72 in the sleeve so that the port A is always in open communication with the interior of the sleeve 34. In the position of the parts shown in Fig. 1, flow into or out of this port A is cut off by engagement of the valve element 38 with the seat 36 formed by the inturned lower end of the sleeve 34. Port B communicates directly with a passage 74 in a part of the body providing a valve seat 76 adapted to be engaged by rubber sealing ring 44 of valve element 38 when the latter is moved downwardly by piston 48. In the position of the parts shown in Fig. 1, port B is in open communication with chamber 78 beneath the cartridge shell 34. This chamber 38 is always in open communication with port O by way of passage 80.

My novel valve is essentially a piston-poppet type of valve with all of the working parts contained within an easily removable cartridge insert. No springs are required in this valve for normal operating pressures of from five pounds per square inch to one hundred and fifty pounds per square inch or more because differential areas in contact with the incoming supply pressure serve to keep the piston-poppet assembly in its up, or de-energized, position, as shown in Fig. 1.

When the valve is installed so that it is normally closed to pressure, port A is connected to a source of fluid under pressure. This pressure acts against the underside of piston 48 and against the upper side of valve element or poppet valve 38. Since the piston 48 has a larger area exposed to fluid pressure than the valve element 38, the valve element is held with its sealing ring 42 firmly in engagement with the valve seat 36 blocking any flow of fluid through port A past this seat 36.

In order to open the valve, fluid pressure is introduced through port 82 into chamber 84 above the piston 48. This forces the piston downwardly and moves the poppet valve from engagement with seat 36 into engagement with machined seat 76. This cuts off port B from communication with the other ports and establishes free communication between ports A and O. It should be noted that in this downward movement of the piston 48 and valve element 38, the pressure exerted on top of the piston is aided by the pressure exerted on the top of the valve element 38 and these two forces combine to move the piston and poppet valve assembly downwardly. In this movement the valve element 38 is guided by fingers or guides 86 provided by the body 30.

When the pressure in chamber 84 above the piston 48 is released, the pressure acting on the underside of the piston 48 overcomes the pressure acting on the upper side of valve element 38 and returns the assembly to the position shown in Fig. 1. This cuts off further inflow of fluid through port A and permits pressure in port O and any cylinder or other mechanism connected therewith to exhaust through port B.

My new and improved valve is also equally adapted to be used in such manner that the cylinder or other mechanism connected to port O is normally connected to fluid pressure. This is accomplished by connecting port B to the source of fluid pressure and using port A as the exhaust port. In this installation fluid pressure entering port B acts upon the lower side of valve element 38 to force this element into engagement with seat 36, thereby cutting off exhaust port A. At the same time pressure port B is in open communication with port O and any fluid operated cylinder or other mechanism connected therewith. By introducing sufficient pressure into chamber 84, the piston 48 and valve element 38 can be moved downwardly until the latter engages valve seat 76 to cut off pressure port B. Port O is then in free communication with exhaust port A and remains so until the pressure above the piston 48 is relieved so that the fluid pressure acting on the lower side of valve element 38 can return the parts to the position shown in Fig. 1.

If it is desired to utilize the valve as a 2-way valve normally closed to pressure, it is only necessary to close off port B by screwing therein a pipe plug like that indicated at 88 in Fig. 2. Likewise, the valve may be utilized as a 2-way valve normally open to pressure by inserting the plug 88 in port A and connecting port B to the source of fluid pressure. In each instance port O is connected to the fluid pressure operated mechanism.

It will be noted that the various parts of my new and improved valve may be of rugged construction and may be readily made by conventional production machinery, using conventional techniques. My valve structure is compact and the valve may be readily supported by the pipes connected to the several ports. In some instances this may not be desirable, and I have therefore provided openings 90 through the valve body so that mounting bolts may be utilized to attach the valve to any suitable support.

In the embodiment of my invention shown in Figs. 4, 5, 6 and 7, the valve body 30 and removable cartridge assembly 32 may be identical with those of the previous embodiment and the several parts thereof bear the same reference numerals. The difference between the two embodiments lies in the fact that the head 62 of the first embodiment has been replaced by a head 100 containing a solenoid operated pilot to control the operation of the piston 48 and poppet or valve element 38 of the main or master valve.

The pilot head 100 includes a poppet valve 102 adapted to be moved to engage either seat 104 or seat 106. This pilot valve is preferably, but not necessarily, composed of a resilient O-ring confined between inturned lips which deform the portion of the O-ring located between the lips to fill the space therebetween but leave undistorted a portion of the O-ring projecting outwardly beyond the lips so that this undistorted portion has a valve seat contacting surface curved as an arc of a circle in the direction of movement of the valve. The resilient ring may be of Hy-Car synthetic rubber or other synthetic or natural rubber or similar material.

Figure 4:
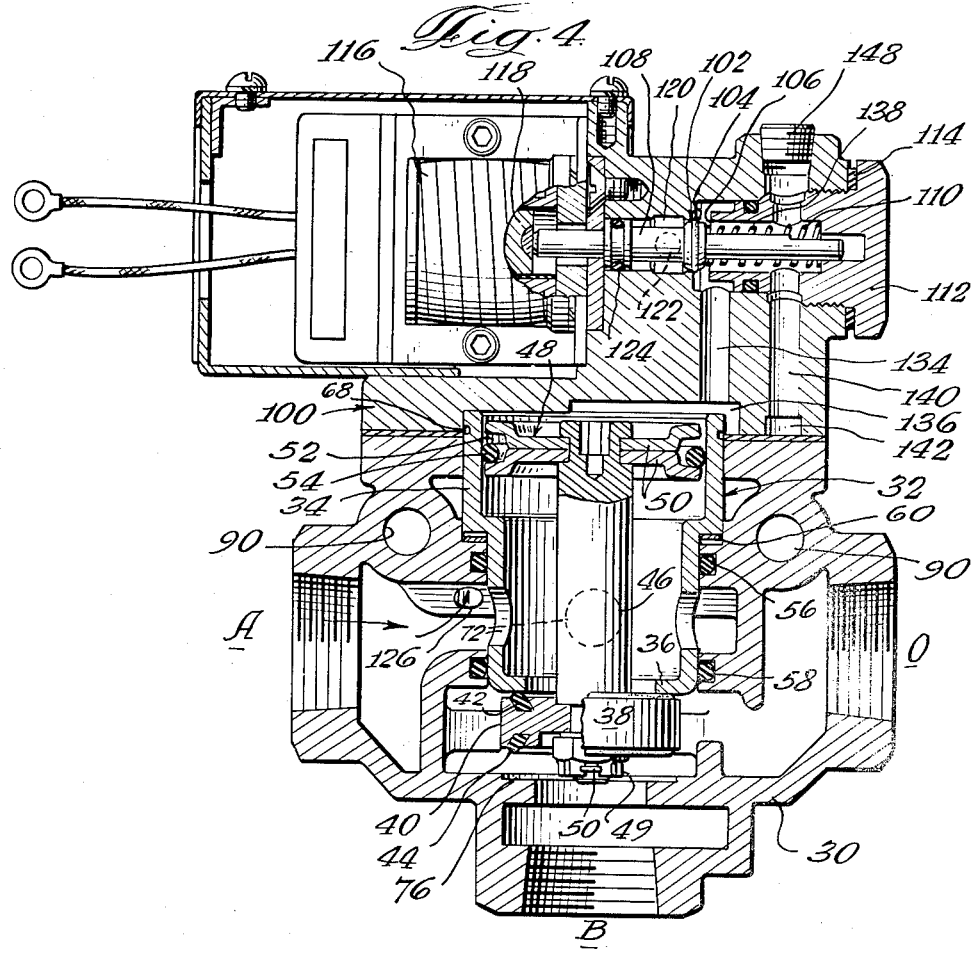
Fig. 4 is a view similar to Fig. 1 but showing a second embodiment of my invention in which the valve is provided with a head containing a solenoid operated pilot. This view is taken on line 4—4 of Fig. 7.
Figure 5:
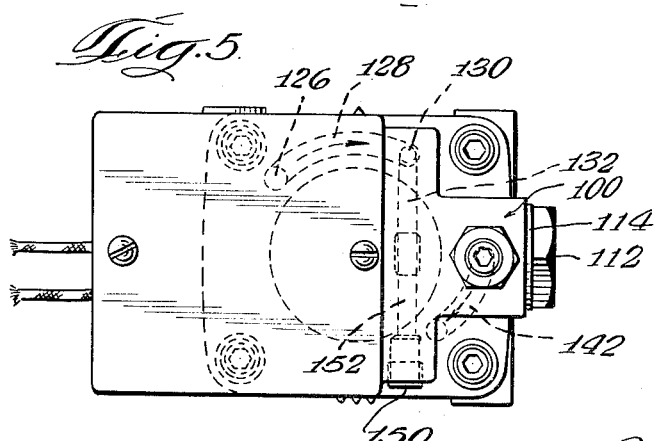
Fig. 5 is a top plan view on a reduced scale of the embodiment of Fig. 4.

The poppet type pilot valve 102 has a two-part valve stem 108 whose left-hand end, as viewed in Fig. 4, is made of stainless steel and whose right-hand end is of naval brass, although other materials may be utilized if desired. The valve 102 and valve stem 108 are urged to the left by a spring 110 confined between the valve 102 and a plug 112 threaded into the head 100 and sealed by a gasket 114. The valve 102 and valve stem 108 are moved to the right by a solenoid 116 having a plunger 118 adapted to engage and push on the adjacent end of the valve stem 108 when the solenoid is energized.

That portion of the valve stem 108 immediately to the left of seat 104 is surrounded by a chamber 120 having a pressure fluid inlet 122. The left-hand end of the chamber 120 encloses a sealing means 124 provided by the piston-rod and serving to prevent escape of fluid from the left-hand end of the chamber 120. The sealing means 124 preferably comprises an O-ring of natural or synthetic rubber or like material having an internal diameter slightly greater than the bottom of the groove in which it is located, and an external diameter the same as the adjacent wall of chamber 120 so that the O-ring is pressed against the chamber wall only by fluid pressure acting thereon.

Figure 6:
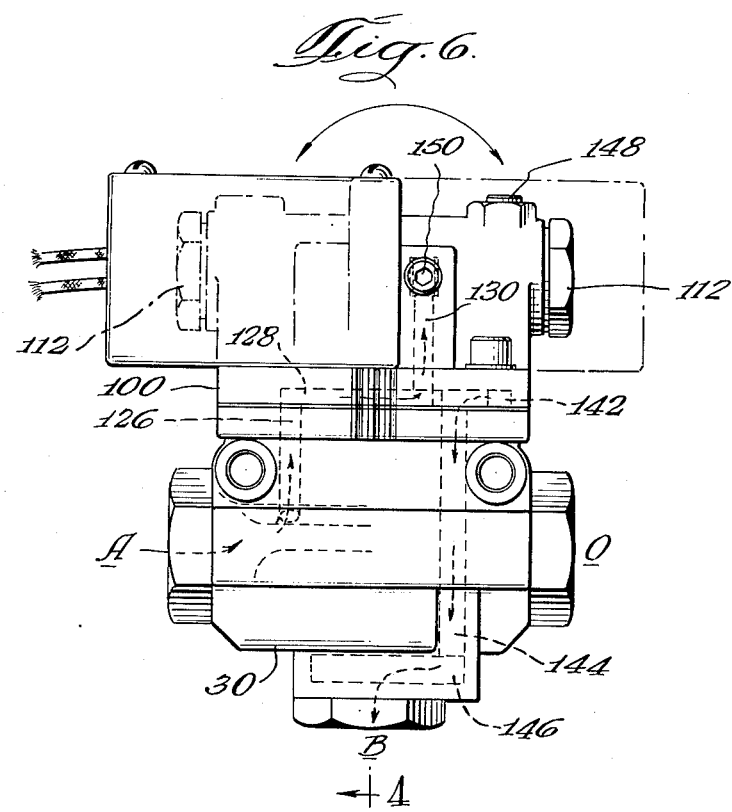
Fig. 6 is a side elevation of the valve shown in Fig. 4.
Figure 7:
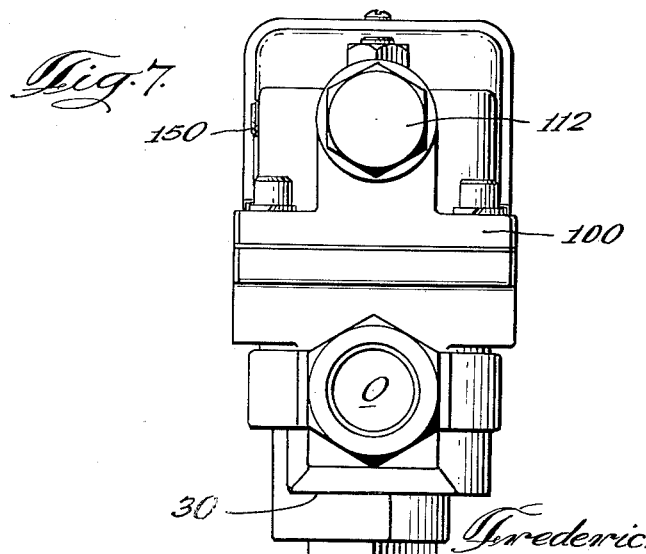
Fig. 7 is an end elevation of the valve shown in Fig. 4.

When the pilot head is in the position shown in Fig. 4 and in full lines in Fig. 6, the inlet 122 of pilot valve chamber 120 is in open communication with main valve port A which is connected to a source of fluid supply if the main valve is to function as a normally closed to pressure valve. Communication between pressure port A and pilot chamber 120 is provided by a vertical passage 126 whose upper end communicates with an arcuate horizontal passage 128 (Figs. 5 and 6) in the head 100. The passage 128 in turn connects with a vertical passage 130 having its upper end connected to a horizontal passage 132 opening into the chamber 120 at 122. When the valve mechanism is in the rest position shown in Fig. 4, the pressure fluid in the chamber 120 is confined between poppet valve 102 and seal 124 and is incapable of actuating the main valve.

When it is desired to connect the pressure supply port A of the main valve with the port O to which the fluid pressure operating mechanism is attached, the solenoid 116 is energized by a remote switch or other suitable means and pushes valve 102 and valve stem 108 to the right, as viewed in Fig. 4, until valve 102 engages seat 106. This establishes communication between pressure chamber 120 and vertical passage 134 which communicates with the top of the piston 48 by way of passage 136 so that the pressure fluid can act upon the piston 48 and move poppet valve 38 downwardly to engage seat 76. This cuts off communication between port O and exhaust port B and establishes communication between pressure port A and port O so that fluid under pressure may flow to the mechanism to be operated thereby.

As soon as the solenoid 116 is de-energized, spring 110 returns pilot valve 102 to the position shown in Fig. 4. This cuts off communication between the pressure chamber 120 and top of piston 48 and connects the upper side of this piston 48 with exhaust port B whereby fluid above the piston 48 may be exhausted and the piston and its poppet valve 38 returned to the position shown in Fig. 4. Communication between the top of the piston 48 and the exhaust port B is by way of passages 136, 134, through valve seat 106 and bore 138 in plug 112, vertical passage 140, horizontal passage 142, vertical passage 144 (Fig. 6) and horizontal passage 146.

Since the operation of piston 48 and its poppet valve 38 are the same in this embodiment of my invention as in the embodiment of Figs. 1, 2 and 3, it is unnecessary again to describe such operation in detail. The pilot head 100 is preferably made of brass, although it could be made of other suitable material, and the pilot valve 102, as previously stated, is preferably given a construction which provides a substantial line contact with its valve seats 104 and 106, even if the valve stem 108 is not exactly perpendicular to the planes of such portion due either to variations in manufacturing tolerance or wear.

A feature of my valve lies in the fact that it may also be connected to function as a normally open to pressure valve by connecting the fluid pressure supply to port B and using port A as an exhaust port. When this type of installation is desired the pilot head 100 is rotated through an angle of 180° to assume the position shown in dot-and-dash lines in Fig. 6. In this position of the pilot head, horizontal passage 128 connects with the upper end of vertical passage 144 to supply fluid under pressure to chamber 120, and horizontal passage 142 communicates with the upper end of vertical passage 126 to permit exhaust of fluid which has been used to operate the piston 48.

My novel pilot operated valve may also be utilized as a two-way valve by inserting a plug 88 (Fig. 2) in the exhaust port B. When this is done it is necessary to supply other means for exhausting the pilot head. This is done by removing plug 148 (Fig. 4).

In some instances it is desirable to use a pilot fluid for operating the piston 48 which is different from the fluid passing through the valve body 30 and controlled by poppet valve 38. For example, if the main valve 30 is utilized to control the flow of oil, it may be desirable to utilize air as a pilot or operating fluid to actuate the piston 48. Under such circumstances, rubber plugs may be inserted in the supply and exhaust passages 126 and 144 at the point where they connect with passages in the pilot head. A separate pilot fluid is introduced by removing plug 150 (Fig. 5) and connecting the normally plugged end of passage 152 with a source of pilot fluid under pressure. Passage 152 is a continuation of the bore of passage 132 and communicates with the other side of pressure chamber 120. The pilot fluid is exhausted through the opening formed by the removal of plug 148.

Where a separate pilot fluid is utilized as just described, it is not necessary to rotate the pilot head 100 through 180° in order to convert the main valve 30 from a normally closed to pressure valve to a normally open to pressure valve. Instead, it is only necessary to connect port B with the source of fluid under pressure and utilize port A as an exhaust port.

Figure 8:
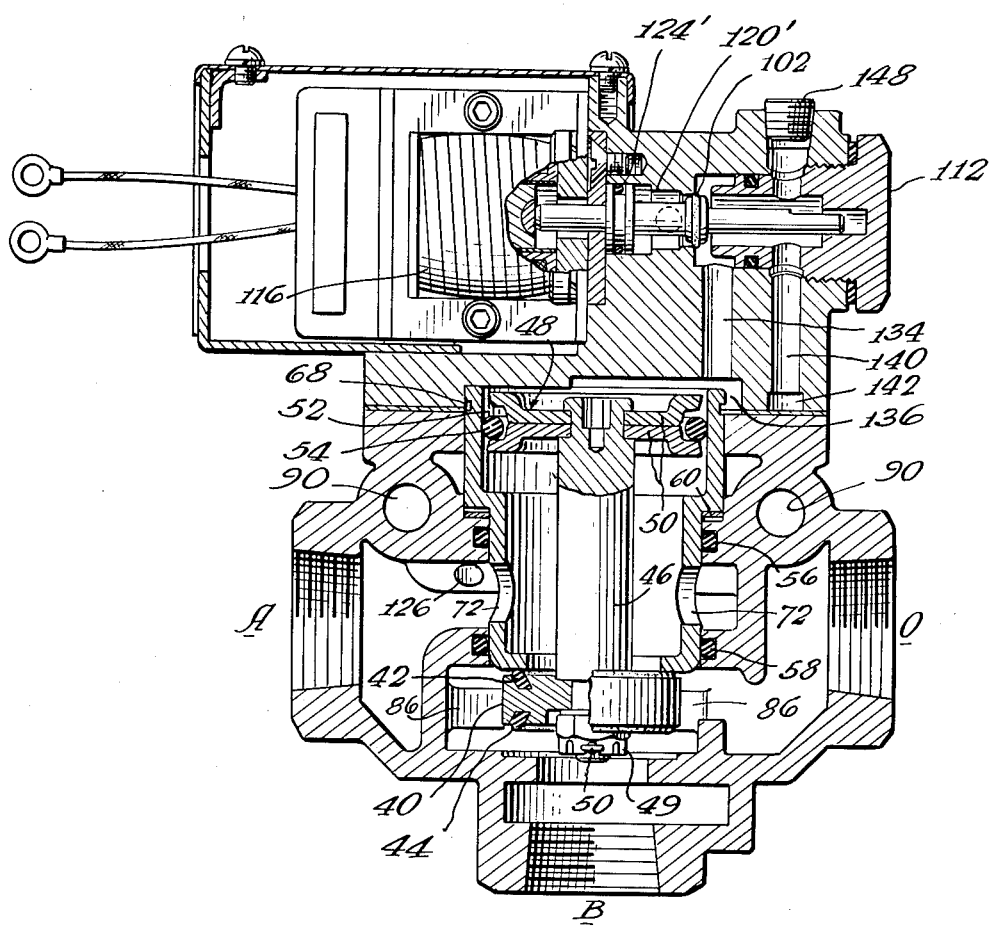
Fig. 8 is a vertical sectional view of a third embodiment of my invention in which the valve is also provided with a head having a solenoid controlled pilot.

The pilot operated valve shown in Fig. 8 is identical with that shown in Figs. 4 to 7 except for the modification of the pilot valve structure to eliminate the pilot valve return spring 110 of the previous embodiment. Since springs are occasionally subject to breakage it is desirable to utilize a springless pilot on a valve for controlling the flow of fluid to a press or other machine where failure of such a spring might prove to be hazardous. That form of my invention embodied in Fig. 8 is particularly adapted for such service.

In the embodiment of Fig. 8, the left-hand end of fluid pressure chamber 120' is enlarged so that the sealing means 124' is of larger area than the valve 102. This difference in area creates a differential pressure which is utilized in lieu of the spring 110 to return the valve 102 to its left-hand or normal position. Since the construction and mode of operation of this embodiment of Fig. 8 is otherwise the same as the embodiment of Figs. 4 to 7, I have marked the corresponding parts of the two embodiments with the same reference numerals and have not repeated a detailed description of the construction and operation of such parts. In the embodiment of Figs. 9 through 12, I have shown my invention embodied in a 4-way master valve comprising a body 154 containing a pair of cartridges 156 and 158 each of which may be identical with the cartridge 32 of the previous embodiments. The body 154 has an inlet port A communicating with the interior of cartridge shell 160 by means of chamber 162 and openings 164 in the shell 160. This fluid pressure acts upon the differential areas of the piston 166 and poppet valve 168 to hold the latter against its seat 170, as shown in Fig. 9. In other words, the cartridge 156 constitutes what I have heretofore referred to as a normally closed to pressure valve.

Chamber 162 is in open communication by way of passage 172 with a chamber 174 beneath valve seat 176 of the other poppet valve 178 so that fluid pressure normally holds this valve in contact with its other valve seat 180. This permits fluid pressure to flow through the passage in valve seat 176 and into chamber 182. Chamber 182 is in direct communication with port O–2 which may be connected with any suitable apparatus, such as one end of a cylinder mechanism, and the cartridge 158 therefor constitutes what I have heretofore referred to as a normally open valve.

A head 184 is attached to body 154 by bolts 186 or other suitable means and provides a chamber 188 communicating with the upper ends of the pistons 166 and 190. Access to the chamber 188 is through a threaded opening 192 which may be connected to any suitable means for supplying fluid under pressure to operate the pistons 166 and 190.

When fluid under pressure is introduced through opening 192 in head 184, pistons 166 and 190 are simultaneously forced downwardly to shift their poppet valves 168 and 178 into contact with valve seats 194 and 176 respectively. This cuts off the supply of pressure fluid to port O–2 and simultaneously connects port O–1 with the source of pressure fluid, since this port O–1 is in direct communication with chamber 196 which then receives a supply of pressure fluid through the opening in valve seat 170. Where ports O–1 and O–2 are connected to opposite ends of a cylinder or similar mechanism, this results in a reversal in operating movement of such mechanism.

When the poppet valves 168 and 178 were in the position shown in Figs. 9 and 12, the port O–1 was in communication with exhaust port B. Port O–1 connects directly with chamber 196 which, as indicated in Fig. 12, was connected with port B by way of passage 198, chamber 200, passage 202, and chamber 204, into which port B opens. The admission of fluid pressure to chamber 188 above the pistons 166 and 190, and the resulting downward movement of poppet valve 168, cut off communication between port O–1 and exhaust port B and connected port O–1 with pressure port A. The simultaneous downward movement of poppet valve 178 cut off communication between port O–2 and pressure port A and connected port O–2 with exhaust port B.

Upon relief of the pressure in chamber 188, fluid pressure returns the pistons 166 and 190 and their valves 168 and 178 to the upper position shown in Figs. 9 and 12. This again reverses the port connections, that is, it reestablishes the fluid pressure connection between ports A and O–2 and again connects port O–1 with exhaust port B.

While I have described port A as the pressure port and port B as the exhaust port, my novel valve is equally adapted to have port B connected to a source of fluid under pressure and port A utilized as the exhaust port. In this latter arrangement port O–1 would be supplied with pressure fluid when the piston and valves are in the up position as shown in Figs. 9 and 12, and port O–2 would be in communication with exhaust port A. This feature has the advantage of eliminating the necessity of crossing supply pipes to a cylinder or other fluid pressure operated apparatus in order to obtain a reversal of the normal position of the cylinder rod or equivalent parts.

In some instances it is desired to control the 4-way master valve by a remote pilot valve which is actuated momentarily to connect chamber 188 with a source of air or other fluid under pressure. This serves to depress the pistons 166 and 190 and their associated poppet valves, and these pistons and valves will remain depressed as long as pressure is maintained in the chamber 188. Since under such circumstances leakage from chamber 188 or its connections with the remote pilot valve would permit return of pistons 166 and 190 and their associated poppet valves, it is desirable provide bleed means to maintain the pressure in the chamber 188. I shall now describe this bleed means.

A passage 206 has a restricted lower end 208 communicating with chamber 196 and an upper end communicating with chamber 188 when the head 184 is in the position shown, that is, with its marking 210 (Fig. 10) registering with the marking 212 on the valve body 154. This means that when poppet valve 168 is moved downwardly to engage seat 194, fluid under pressure can bleed into chamber 188 and compensate for any leakage therefrom. When the remote pilot valve is operated to connect chamber 188 with atmosphere, the slight flow through this bleed passage 206 is insufficient to maintain pressure in chamber 188 and pistons 166 and 190 and their poppet valves return to the up position shown in Figs. 9 and 12. This cuts off further flow of fluid through bleed passage 206 to chamber 188.

When port B is utilized as the pressure port and port A as the exhaust port, the passage 206 would not accomplish its desired function and I therefore provide means to close this passage and to provide an alternative bleed passage 214 (Figs. 11 and 12) having a restricted lower end 216 communicating with chamber 182. When the head 184 is in the position shown with its marking 210 registering with marking 212 a boss 218 closes the upper end of bleed passage 214 and also closes the upper ends of pilot passages 220 and 222 which are provided for use with a pilot head as described in connection with the following embodiment of my invention. When it is desired to use port B as the pressure port and port A as the exhaust port, the head 184 is turned through an angle of 180° so that its marking 210 is on the opposite side of the valve structure from the marking 212. Under these circumstances, the boss 218 closes the upper ends of passages 206, 220 and 222 but does not close the upper end of bleed passage 214 which then functions to compensate for any leakage of fluid from the chamber 218.

The embodiment of my invention shown in Figs. 13 through 18 incorporates a 4-way master valve like that of Figs. 9 through 12. In the embodiment of Figs. 13–18, however, a small 3-way pilot valve operated by a solenoid is mounted directly on the master or main valve and the design is such that pilot fluid under pressure is obtained from the main valve and exhausted to join the exhaust of the main valve.

The body 154 of the embodiment of Figs. 13 through 18 may be identical with the body 154 of the previous embodiment, although the presence of the pilot mechanism utilizes the passages 222 (Fig. 13) and 220 (Fig. 17) which are not required where the valve is provided wtih the head 184 of the previous embodiment. However, for simplicity in manufacture and merchandising it is desirable to provide all 4-way valve bodies with the bleed passages 206 and 214 and the pilot passages 220 and 222 and simply to cover such of the passages as are not in use.

In view of the identity of the valve body 154 with that of the previous embodiment, corresponding parts have been given identical reference numerals and a detailed description of such parts and their mode of operation will not be repeated. The solenoid operated pilot valve mechanism is also similar to the first such mechanism described and I shall therefore confine my description of the embodiment of Figs. 13–18 mainly to an explanation of the connecting passages between the pilot valve mechanism and the main valves.

A spacer plate 224 is mounted directly on valve body 154 between this body and a pilot head 226. This spacer plate 224 has a flat circular chamber 228 immediately above the piston 166, and a similar chamber 230 immediately above the piston 190. The chambers 228 and 230 are connected by a passage 232 (Fig. 15). A short vertical passage 234 in spacer plate 224 connects at its lower end with chamber 230 and its upper end with a continuing passage 236 in pilot head 224 and leading to chamber 238.

Spacer plate 224 also has a curved horizontal passage 240 connecting the upper end of passage 222 with a vertical passage 242 connecting with passages 244 and 246 leading to pilot pressure chamber 248.

A pilot valve 250 is normally held by a spring 252 against a seat 254 to close off communication between pressure chamber 248 and chamber 238. When solenoid 256 is energized valve 250 is moved into engagement with seat 258 and establishes communication between pressure chamber 248 and chamber 238. This permits fluid under pressure in chamber 162 and passage 172 to flow upwardly through passages 222, 240, 242, 244, 246, chambers 248 and 238, and passages 236 and 234 into the chamber 230 above the piston 190. From this chamber 230 the fluid under pressure passes through horizontal passage 232 (Fig. 15) to chamber 228 above piston 166 whereupon both pistons 166 and 190 are moved downwardly with their poppet valves 168 and 178 and remain in this position as long as solenoid 256 is energized. De-energization of solenoid 256 permits spring 252 to return pilot valve 250 into engagement with its seat 254. This cuts off further flow of fluid into the chambers above the pistons 166 and 190 and permits these chambers to exhaust by way of passages 234, 236 chamber 238, passages 260 and 262 in plug 264, vertical passage 266, and horizontal passage 268 in pilot head 226, passage 270 in spacer plate 224, and passage 220. The lower end of passage 220 communicates with passage 202 which is in open communication with exhaust port B by way of chamber 204.

If it is desired to utilize port B as a pressure port and port A as an exhaust port, spacer plate 224 and pilot head 226 are rotated through an angle of 180° so that the marking 272 (Fig. 16) on the spacer plate no longer registers with the marking 274 on the valve body 154 but is on the opposite side therefrom. In this arrangement of the spacer plate and pilot head, passage 220 in the valve body becomes the pilot fluid supply passage and connects with horizontal passage 240 in the spacer plate 224 and passage 222 in the valve body 154 becomes the exhaust passage and communicates with vertical passage 270 in spacer plate 224. In both positions of the spacer plate and pilot head, the spacer plate closes the upper ends of bleed passages 206 and 214 so that these passages are inoperative.

If it is desired to use a dissimilar pilot fluid or a pilot fluid under a different pressure than the fluid of the main valve, this can be accomplished by removing the plugs 276 and 278 and plugging passages 246 and 266. The passage 280 is then connected to a source of fluid under pressure to supply fluid to the pressure chamber 248, and the passage 282 is utilized as an exhaust passage for the pilot fluid. Such dissimilar pilot fluid or pilot pressure can be utilized with either position of the pilot head 226 and spacer plate 224.

The embodiment of my invention shown in Fig. 19 is identical with the previous embodiment of Figs. 13–18 except for the structure of the pilot head and the manner in which the pilot head functions. The pilot controlled valve of Fig. 19 has the advantage that it eliminates the use of holding relays or the continuous energization of the pilot solenoid. This eliminates any danger of malfunctioning of the valve due to electrical failure in the pilot solenoid circuit. When port A of the main valve is utilized as a pressure port, fluid under pressure is supplied to a pilot pressure chamber 290 by way of passage 222 in the main valve body 154, passages 240 and 242 in the spacer plate 224, and passages 292 and 294 in pilot head 296. Chamber 290 is located between a seal 298 and pilot valve 300 both attached to a pilot stem 302. In the position shown in Fig. 19 pilot valve 300 is in engagement with its seat 304 so that chamber 290 is closed against outflow of fluid, and since valve 300 and seal 298 are of the same diameter pilot stem 302 is balanced and remains in the position shown until solenoid 306 is energized.

Such energization of solenoid 306 shifts valve 300 to the left and into engagement with its seat 308. This permits pilot fluid to flow from pilot pressure chamber 290 through passages 310, 312, 314 and 316 to passage 234 in spacer plate 224 leading to the chambers above the pistons 166 and 190. This results in downward movement of these pistons 166 and 190 and their poppet valves 168 and 178. Since the pilot stem 304 is also balanced in this position it is not necessary to maintain solenoid 306 energized.

In order to permit return of pistons 106 and 190 with their valves 168 and 178, it is only necessary to momentarily energize solenoid 318 to return the pilot valve stem to the position shown in Fig. 19. This permits the fluid to exhaust by way of passages 320, 322, in pilot head 296, passage 270 (Fig. 17) in spacer plate 224, and passage 220 in valve body 154, there being a horizontal passage (not shown) in pilot head 296 connecting passage 322 with the upper end of passage 270. The pilot valve stem 302 remains in this position until solenoid 306 is again energized momentarily to shift the valve stem to the left. From the foregoing it will be apparent that the pilot valve stem 302 and its valve 300 are balanced when the valve is in engagement with either of its seats so that one or the other solenoid need be energized only during the brief interval required to shift the pilot valve 300 from one of its seats to the other.

With this type of solenoid head it is not neccessary to rotate the head or spacer plate 324 through 180° when it is desired to use the port B as a pressure port and the port A as an exhaust port. When port B is the pressure port, chamber 326 in the pilot head becomes a pressure chamber, being supplied with fluid under pressure through passage 320 in valve body 154 and the pilot fluid is exhausted through chamber 290 and the connections leading to passage 222 in the valve body 154. If it is desired to utilize a separate pilot fluid or a pilot fluid under a different pressure, plugs 328 and 330 may be removed and either of the openings thereby created connected to a source of fluid and the other utilized as an exhaust outlet. When this is done the passages 294 and 320 are plugged.

From the foregoing description of several embodiments of my invention it will be apparent that I have provided a new and improved valve of great flexibility and adaptability. This valve has a cartridge including all moving parts which may be removed without disturbing the pipe connections to the main valve ports so that all working parts of the valve can be inspected or repaired. Likewise, where a pilot head is utilized, the working parts of the pilot mechanism may be removed for inspection or repair without disturbing the piping connections to the main or master valve. The absence of threaded connections between the cartridge and valve body reduces cost of manufacture and facilitates insertion and removal of the cartridge.

Another feature of my invention lies in the design of a structure which may be incorporated in a 2-way, 3-way, or 4-way valve, operable either as a normally open to pressure or a normally closed to pressure valve and wherein the piston-poppet assembly of the main valve is moved by internal fluid pressure acting against unbalanced areas so that the poppet is always held firmly against one or the other of its seats and no springs are required.

Another feature of my invention lies in the adaptability of the main or master valve to various forms of remote and attached pilot valve mechanisms and the structures and operating characteristics thereof.

It is to be further understood that my invention is not limited to the details shown and described, but is capable

I claim:

1. In a valve, the combination comprising a body having a two-diameter cartridge-receiving bore extending into one end thereof, a cartridge including a two-diameter tubular shell removably received in said cartridge-receiving bore, a head member detachably secured to said one end of said body and confining said tubular shell in said cartridge-receiving bore, said shell having a first end portion adjacent said head member and a second end portion relatively more remote from said head member and relatively smaller in diameter than said first end portion, said first end portion having a piston-receiving bore therein, a piston slideably and sealingly received in said piston-receiving bore and reciprocable therein through a predetermined range of movement, said second end portion of said shell having an inturned flange with a first axial valve port therein communicating with said piston-receiving bore, said flange defining a first annular valve seat thereon around said port and facing away from said piston, a poppet valve member having a first annular sealing element engageable with said seat, an interconnecting stem member of smaller cross-section than said first valve port and extending therethrough between said piston and said poppet valve member, said shell having a lateral opening therein between said valve port and said piston, a first fluid-carrying opening in said body and communicating with said lateral opening in said shell, said sealing element being of a smaller internal diameter than said piston-receiving bore so that fluid pressure in said shell will act differentially on said piston and will tend to seat said poppet valve member against said first seat, said poppet valve member being of smaller external diameter than said shell for insertion and removal therewith into and out of said cartridge-receiving bore, said body having second and third fluid-carrying passages therein, said second passage receiving said poppet valve member and communicating with said valve port with said valve member unseated from said first seat, a second valve port aligned axially with said poppet valve member and extending in said body between said second and third passages, a second annular valve seat in said body around said second port and facing toward said first seat, said poppet valve member having a second annular sealing element movable therewith into sealing engagement with said second seat, said poppet valve member being movable between said seats, said head member having a fourth fluid-carrying passage therein communicating with said piston-receiving bore on the opposite side of said piston from said stem member for applying pilot fluid to said piston and thereby shifting said poppet valve member between said first and second seats.

2. In a valve, the combination comprising a body having a cartridge-receiving bore extending into one end thereof, a cartridge including a tubular shell removably received in said cartridge-receiving bore, a head member detachably secured to said one end of said body and confining said tubular shell in said cartridge-receiving bore, said shell having a first end portion adjacent said head member and a second end portion relatively more remote from said head member, said first end portion having a piston-receiving bore therein, a piston slideably and sealingly received in said piston-receiving bore and reciprocable therein through a predetermined range of movement, said second end portion of said shell having a first axial valve port therein communicating with said piston-receiving bore, said second end portion having a first annular valve seat thereon around said port and facing away from said piston, a poppet valve member having a first annular sealing element engageable with said seat, an interconnecting stem member of smaller cross-section than said first valve port and extending therethrough between said piston and said poppet valve member, said shell having a lateral opening therein between said valve port and said piston, a first fluid-carrying opening in said body and communicating with said lateral opening in said shell, said sealing element being of a smaller internal diameter than said piston-receiving bore so that fluid pressure in said shell will act differentially on said piston and will tend to seat said poppet valve member against said first seat, said poppet valve member being at least as small in external diameter as said shell for insertion and removal therewith into and out of said cartridge-receiving bore, said body having second and third fluid-carrying openings therein, said second opening receiving said poppet valve member and communicating with said valve port with said valve member unseated from said first seat, a second valve port aligned with said poppet valve member and extending in said body between said second and third openings, a second annular valve seat in said body around said second port and facing toward said first seat, said poppet valve member having a second annular sealing element movable therewith into sealing engagement with said second seat, said poppet valve member being movable between said seats, said head member having a fourth fluid-carrying opening therein communicating with said piston-receiving bore on the opposite side of said piston from said stem member for applying pilot fluid to said piston and thereby shifting said poppet valve member between said first and second seats.

3. In a valve, the combination comprising a body having a cartridge-receiving bore therein, a cartridge including a tubular shell removably received in said cartridge-receiving bore, a head detachably secured to said body and confining said tubular shell in said bore, said shell having a first end portion adjacent said head and a second end portion relatively more remote from said head, said first end portion having a piston-receiving bore therein, a piston reciprocable in said piston-receiving bore through a predetermined range of movement, said second end portion of said shell having a first axial valve port therein communicating with said piston-receiving bore, a first annular valve seat on said shell around said port and facing away from said piston, a poppet valve having an annular sealing portion engageable with said seat, a stem interconnecting said poppet valve and said piston and extending through said port, said stem being of smaller cross-section than said port, said shell having a lateral opening therein disposed between said port and said piston, a first fluid-carrying opening in said body and communicating with said lateral opening in said shell, said piston being of greater diameter than said sealing portion of said poppet valve so that fluid pressure in said shell will act differentially on said piston and will tend to seat said poppet valve on said first seat, said body having second and third fluid-carrying openings therein, said second opening receiving said poppet valve and communicating with said first port, a second valve port aligned with said first port and extending in said body between said second and third openings, a second annular valve seat in said body around said second port and facing toward said first seat, said poppet valve being movable between said seats for selectively closing said ports, and a fluid-carrying opening in said head and communicating with said piston-receiving bore on the opposite side of said piston from said stem for applying pilot fluid to said piston and thereby shifting said poppet valve between said first and second seats.

4. In a valve, the combination comprising a body having a cartridge-receiving bore therein, a cartridge including a tubular shell removably received in said cartridge-receiving bore, a head detachably secured to said body and confining said tubular shell in said bore, said shell having a piston-receiving bore therein, a piston reciprocable in said piston-receiving bore through a predetermined range of movement, said shell having a first axial valve port therein communicating with said piston-receiving bore, a first annular valve seat on said shell around said port and facing away from said piston, a poppet valve having an annular sealing portion engageable with said seat, a stem interconnecting said poppet valve and said piston and extending through said port, said stem being of smaller cross-section than said port, said shell having a lateral opening therein disposed between said port and said piston, a first fluid-carrying opening in said body and communicating with said lateral opening in said shell, said piston being of greater diameter than said sealing portion of said poppet valve so that fluid pressure in said shell will act differentially on said piston and will tend to seat said poppet valve on said first seat, said body having second and third fluid-carrying openings therein, said second opening receiving said poppet valve and communicating with said first port, a second valve port aligned with said first port and extending in said body between said second and third openings, a second annular valve seat in said body around said second port and facing toward said first seat, said poppet valve being movable between said seats for selectively closing said ports, and a fluid-carrying opening in said head and communicating with said piston-receiving bore on the opposite side of said piston from said stem for applying pilot fluid to said piston and thereby shifting said poppet valve between said first and second seats.

5. In a valve, the combination comprising a body having first and second cartridge-receiving bores therein, first and second cartridges in said bores, each of said cartridges including a tubular shell removably received in said bore, said shell having a piston-receiving bore therein, a piston reciprocable in said piston-receiving bore, said shell having an axial valve port therein communicating with said piston-receiving bore, an annular valve seat on said shell around said port and facing away from said piston, a poppet valve having an annular sealing portion engageable with said seat, and a stem interconnecting said valve and said piston and extending through said port, said stem being of smaller cross-section than said port, said shell having a lateral opening therein disposed between said port and said piston, a head detachably secured to said body and confining said first and second cartridges in said respective bores, first and second fluid-carrying openings in said body and communicating with said respective lateral openings of said first and second cartridges, said piston of each cartridge being of greater cross-section than said sealing portion of said valve so that fluid pressure in said shell will act differentially on said piston and will tend to seat said valve on said seat, first and second outlets in said body and receiving said respective poppet valves, a first passage in said body communicating with said second opening, a second passage in said body communicating with said first opening, third and fourth valve ports extending in said body between said respective outlets and passages, third and fourth valve seats around said third and fourth ports and facing toward said respective first and second seats in alignment therewith, said poppet valve of said first cartridge being movable between said first and third seats, said poppet valve of said second cartridge being movable between said second and fourth seats, and a pilot fluid passage in said head communicating in common with said piston-receiving bores on the opposite sides of said pistons from said stems for shifting said valves between said oppositely facing seats, working fluid in either or both of said first and second openings being effective to bias said valves against said first and second seats.

6. In a valve, the combination comprising a body having first and second cartridge-receiving bores therein, first and second cartridges in said bores, each of said cartridges including a tubular shell removably received in said bore, said shell having a piston-receiving bore therein, a piston reciprocable in said piston-receiving bore, said shell having an axial valve port therein communicating with said piston-receiving bore, an annular valve seat on said shell around said port and facing away from said piston, a poppet valve having an annular sealing portion engageable with said seat, and a stem interconnecting said valve and said piston and extending through said port, said stem being of smaller cross-section than said port, said shell having a lateral opening therein disposed between said port and said piston, head means detachably secured to said body and confining said first and second cartridges in said respective bores, first and second fluid-carrying openings in said body and communicating with said respective lateral openings of said first and second cartridges, said piston of each cartridge being of greater cross-section than said sealing portion of said valve so that fluid pressure in said shell will act differentially on said piston and will tend to seat said valve on said seat, first and second fluid-carrying chambers in said body and receiving said respective poppet valves, a first passage in said body communicating with said second opening, a second passage in said body communicating with said first opening, third and fourth valve ports extending in said body between said respective chambers and passages, third and fourth valve seats around said third and fourth ports and facing toward said respective first and second cartridge seats in alignment therewith, said poppet valve of said first cartridge being movable between said first and third seats, said poppet valve of said second cartridge being movable between said second and fourth seats, pilot fluid passage means in said head means communicating in common with said piston-receiving bores on the opposite sides of said pistons from said stems for shifting said valves between said oppositely facing seats, working fluid in either or both of said first and second openings being effective to bias said valves against said first and second seats.

7. In a valve, the combination comprising a body having means therein defining first and second piston-receiving bores, first and second valve ports communicating axially with said respective bores, first and second pistons reciprocable in said respective bores through predetermined ranges, first and second fluid-carrying openings in said body communicating with said respective bores between said ports and said pistons, said body having means therein defining first and second annular valve seats around said respective ports and facing away from said pistons, first and second poppet valves having annular seating portions engageable with said respective seats, first and second interconnecting stems of smaller cross-section than said ports and extending therethrough between said respective poppet valves and pistons, said annular seating portions of said poppet valves being of smaller cross-section than said pistons so that fluid pressure in said first and second openings will act differentially on said pistons to seat said valves against said respective seats, said body having first and second fluid-carrying chambers therein receiving said respective poppet valves and communicating with said ports, said body having a first fluid-carrying passage therein communicating with said second opening, a third valve port extending in said body between said first chamber and said first passage, a second fluid-carrying passage in said body communicating with said first opening, a fourth valve port extending in said body between said second chamber and said second passage, third and fourth annular valve seats around said third and fourth ports and facing toward said respective first and second seats in alignment therewith, said first poppet valve being movable between said first and third seats for selectively closing said first and third ports, said second poppet valve being movable between said second and fourth seats for selectively closing said second and fourth ports, and means on said body defining a pilot fluid opening communicating in common with said piston-receiving bores on the opposite sides of said pistons from said respective stems for applying pilot fluid to said pistons and thereby shifting said valves simultaneously between said oppositely facing ports, working fluid pressure in either or both of said first and second openings being effective to bias said valves against said first and second seats.

References Cited in the file of this patent

UNITED STATES PATENTS

| | | |
|---|---|---|
| 443,789 | Onglew | Dec. 30, 1890 |
| 1,025,559 | Bliss | May 7, 1912 |
| 1,571,396 | Darrow | Feb. 2, 1926 |
| 1,709,903 | Farmer | Apr. 23, 1929 |
| 1,827,470 | Harrison | Oct. 13, 1931 |
| 1,930,557 | Hughes | Oct. 17, 1933 |
| 2,227,542 | Grove | Jan. 7, 1941 |
| 2,294,702 | Van Der Werff | Sept. 1, 1942 |
| 2,328,830 | Maxon | Sept. 7, 1943 |
| 2,338,101 | Ellinwood | Jan. 4, 1944 |
| 2,341,758 | Carpenter | Feb. 15, 1944 |
| 2,509,880 | Pelton | May 30, 1950 |
| 2,646,820 | McLeod | July 28, 1953 |